United States Patent Office

2,833,743
Patented May 6, 1958

2,833,743

POLYCYANOHYDRINS PRODUCED BY REACTING HYDROCYANIC ACID WITH A STYRENE-METHACROLEIN COPOLYMER

Raymond H. Reinhard, Galveston, Tex., assignor to Monsanto Chemical Company, St. Louis, Mo., a corporation of Delaware No Drawing. Application December 13, 1955
Serial No. 552,719

11 Claims. (Cl. 260—73)

This invention relates to new compositions of matter and, more particularly, to novel polymeric materials.

An object of the invention is to provide new polymers containing both hydroxyl and nitrile groups and compositions containing them. This and other objects, which will appear hereinafter, are attained by reacting a copolymer of styrene and methacrolein with hydrocyanic acid in the presence of a basic catalyst. The resulting polymer is referred to as a polycyanohydrin because one of the repeating units in its structure which may be described by the general formula

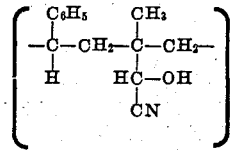

contains the characteristic cyanohydrin grouping.

The following examples in which the proportions of reactants are given in parts by weight are illustrative of the invention.

*Example I*

A styrene-methacrolein copolymer was prepared as follows: A mixture of 630.0 parts of styrene, 420.0 parts of methacrolein, and 82 parts of di-tert-butyl peroxide contained in 550 parts of xylene was charged to a continuous tubular reactor immersed in a constant temperature bath. The mixture was fed at a rate such that it was subjected to polymerization at a temperature of 160° C. and a pressure of 1000 p. s. i. g. for a period of 30 minutes during passage through the reactor. The reaction mixture, a lemon yellow syrup comprising a solution of the polymer in unreacted monomer and xylene solvent, was then heated under vacuum to a temperature of 150° C. to remove the solvent and unreacted monomers and isolate the solid polymer which was a dark yellow brittle material having a composition of 52% by weight of methacrolein and 48% by weight of styrene.

A two-liter, three-necked flask fitted with a stirrer, a thermowell, a reflux condenser and jacketed dropping funnel was employed as the reacter for converting the polymer to the cyanohydrin. Ice water was pumped through the reflux condenser and dropping funnel. The flask was clamped in such a manner that it could be alternately cooled by playing ice water on it or heated by attaching a heating mantle to it. Into this flask was placed 100 parts of the 48% styrene–52% methacrolein copolymer made as described above and dissolved in one liter of benzene to which 2 ml. of pyridine had been added. The mixture was cooled to 10° C. by means of an ice bath and 17.5 parts of HCN were added from the dropping funnel over a 30-minute period. The temperature was then raised to 60° C. and maintained at that level for 2 hours. Unreacted HCN was allowed to weather off and the mixture was then heated under vacuum to remove most of the solvent. The polymeric product was recovered by precipitation in water and dried at 60° C. for 16 hours.

The dried polymer, a yellow brittle solid, was analyzed and found to contain 1.66% nitrogen by the Kjeldahl method and to have an average primary hydroxyl content of 3.23%.

*Example II*

Another copolymer was prepared as in Example I containing 35% by weight styrene and 65% methacrolein. About 100 parts of this copolymer was dissolved in toluene containing approximately 0.7 part of triethylamine and the mixture was cooled to 10° C. As in Example I, 35 parts of HCN was added slowly. Approximately 15 seconds after the HCN was added the solution became cloudy and polymer was precipitated in one mass while a temperature increase to 25° C. was observed. The solvent and unreacted HCN were decanted and the polymer, resembling dry cheese in consistency, was air dried at room temperature, then ground to a powder and further dried in a vacuum oven at 60° C. for 16 hours. The nitrogen content of this polymer as determined by Kjeldahl analysis was 4.07% while the primary hydroxyl content was 4.94%. The specific viscosity of a solution of 0.6000 g. of the polymer in 50.00 ml. of methyl ethyl ketone at 30° C. was 0.069.

*Example III*

In this run, a two-liter beaker was substituted for the flask of the previous examples as a reactor to facilitate removal of the precipitated polymer. Approximately 100 parts of a 48% styrene–52% methacrolein copolymer was dissolved in C. P. toluene and cooled to 20° C. Then about 2.2 parts of triethylamine and 24.5 parts of HCN were added to the polymer solution with stirring. The polymeric product was precipitated as a solid mass from the solution. The solvent was decanted and the polymer was air dried at room temperature, after which it was ground to a fine powder and dried in a vacuum oven at 60° C. for 16 hours. The polycyanohydrin thus obtained had a nitrogen content of 3.49% and contained 4.02% hydroxyl groups determined as primary hydroxyl. The specific viscosity of a solution of the polymer in methyl ethyl ketone (0.6000 g. in 5 ml.) was 0.086.

*Example IV*

Using a beaker as a reactor as in Example III, 100 parts of a 35% styrene–65% methacrolein copolymer was dissolved in a solvent mixture consisting of 650 ml. of toluene and 500 ml. of n-butanol. This solution was cooled to 15° C. and 7.3 parts of triethylamine catalyst was added. Then 35 parts of liquid HCN was added slowly with stirring. Stirring was continued for 10 minutes after HCN addition was completed and the temperature was allowed to rise to about 25° C. The polycyanohydrin product did not precipitate as in the previous examples. A portion of the solvent was removed (about 500 ml.) by distillation at reduced pressure and the polycayonhydrin product was then precipitated by adding n-hexane to the residual reaction mixture. The mixture was filtered and the solid polymer was dried under vacuum at 40° C. for 16 hours. The hydroxyl content of this polymer was determined to be 6.32% while its nitrogen content was found to be 3.75% by Kjeldahl analysis.

The invention is not to be considered as limited to the exact reaction conditions, quantities, specific reactants, etc., set forth in the examples. Many variations may be made in these without departing from the scope of the invention. For instance, any temperature within the range from 0° C. to about 100° C. may be employed. Temperatures are preferably maintained in an open system from about 10° C. to about 25° C., i. e., below the boiling point of HCN, but the reaction may be effected just as satisfactorily at temperatures from 25° C. to 100°

C. while operating in a so-called closed system wherein an HCN reflux condenser is employed.

The reaction is easily carried out at atmospheric pressure and this is the preferred pressure although the use of super-atmospheric pressure is not precluded and may be employed if so desired.

The amount of HCN to be employed is related to the aldehyde content of the copolymer. The theoretical or stoichiometric mole ratio of aldehyde to HCN of 1:1 may be employed. However, it is preferable to employ the HCN reactant in slight excess, say, about 10% over the theoretical molar amount required to react with the aldehyde present. Larger excesses may be employed but these necessitate recovery and recycle of the HCN in order to be economically practicable.

Catalysts suitable for the reaction are those which are basic in nature, particularly organic amines. In addition to those exemplified, trimethylamine, benzylamine, n-, sec-, and tert-butyl amines, triisobutyl amine and like compounds can be employed successfully. The catalyst may be employed in any quantity from as little as 0.1% by weight to about 10% by weight of the copolymer to be reacted but preferably the quantity of catalyst used is kept within the range from about 1% to about 3% by weight of the copolymer.

Any solvent in which the styrene-methacrolein copolymer will dissolve and which themselves will not react with HCN may be used as the reaction medium. Suitable solvents include, for example, benzene, toluene, xylene, ethylbenzene, and the like or mixtures of such solvents with aliphatic alcohols such as benzene-methanol, xylene-butanol, toluene-propanol and like mixtures. Solvents in which the polycyanohydrin is insoluble facilitate recovery of the polymeric product of the invention since it precipitates readily from the reaction mixture as it forms. It appears, however, that more complete reaction is favored when the reaction is conducted in a solvent medium in which the polycyanohydrin is also soluble as, for example, the toluene-n-butanol mixture shown in the examples. In this latter case though, recovery of the product free from all contamination by the solvent is somewhat difficult, usually requiring evaporation or distillation of the greater part followed by precipitation of the polycyanohydrin through the medium of addition of a non-solvent such as n-hexane or water, for example.

The polycyanohydrins of the invention are particularly useful in coating compositions as the main constituent thereof with relatively minor amounts of other coating resins or they may be used in relatively small amounts as modifiers for other coating resins. The following example describes one application.

*Example V*

A solution of about 5 parts of the polycyanohydrin prepared in Example III in 15 ml. of a xylene-butanol (1:1) mixture was prepared. Approximately 8 ml. of a solution of a trimethylol melamine butyl ether in a xylene-butanol (1:1) solvent mixture having a solids content of about 50% was added to the polymer solution and the two solutions were thoroughly mixed to yield a clear homogeneous solution. A thin layer of this solution was spread on a 10-mil coke steel tin plate and allowed to air dry for about 20 minutes at room temperature. The film was then "set" by heating or baking at 150° C. for 20 minutes. The cured film was hard, adhered well to the metal and was both resistant to alkalies and to solvents and mixtures of solvents such as benzene, toluene, benzene-methanol, toluene-butanol and the like.

Various pigments, fillers, dyes and other conventional additives may be added to the solutions such as that of Example V to yield coating compositions.

What is claimed is:

1. A process for the preparation of polycyanohydrins which comprises reacting a copolymer of styrene and methacrolein in an organic solvent medium with hydrocyanic acid in the presence of an organic amine catalyst at a temperature within the range from about 0° C. to about 100° C., said copolymer and hydrocyanic reactants being employed in proportions such that the mole ratio of hydrocyanic acid to aldehyde present is at least 1:1.

2. A process for the preparation of polycyanohydrins which comprises reacting a copolymer of styrene and methacrolein in an organic solvent medium with hydrocyanic acid in the presence of an organic amine catalyst at a temperature within the range from about 0° C. to about 100° C., said copolymer containing an amount of styrene in the range from about 10% to about 90% by weight and an amount of methacrolein in the range from about 10% to about 90% by weight, and said copolymer and hydrocyanic acid reactants being employed in proportion such that the mole ratio of hydrocyanic acid to aldehyde present is at least 1:1.

3. A process for the preparation of polycyanohydrins which comprises reacting a copolymer of styrene and methacrolein in an organic solvent medium with hydrocyanic acid in the presence of an organic amine catalyst in an amount in the range from about 1% to about 10% by weight of the coplymer and at a temperature within the range from about 10° C. to about 25° C., said copolymer containing an amount of styrene in the range from about 10% to about 90% by weight and an amount of methacrolein in the range from about 10% to about 90% by weight and said coplymer and hydrocyanic acid reactants being employed in proportions such that the mole ratio of hydrocyanic acid to aldehyde present is at least 1:1.

4. A process for the preparation of a polycyanohydrin which comprises reacting a copolymer of styrene and methacrolein dissolved in toluene with hydrocyanic acid in the presence of triethylamine as a catalyst at a temperature within the range from about 10° C. to about 25° C., said copolymer containing approximately 48% by weight of styrene and 52% by weight of methacrolein, said copolymer and hydrocyanic acid reactants being employed in proportion such that the mole ratio of hydrocyanic acid to aldehyde present is at least 1:1, and said catalyst being present in an amount in the range from about 1% to about 3% by weight of the copolymer.

5. A process for the preparation of a polycyanohydrin which comprises reacting a copolymer of styrene and methacrolein dissolved in a toluene-n-butanol solvent mixture with hydrocyanic acid in the presence of triethylamine as a catalyst at a temperature within the range from about 10° C. to about 25° C., said copolymer containing approximately 35% by weight of styrene and 65% by weight of methacrolein, said copolymer and hydrocyanic acid reactants being employed in proportion such that the mole ratio of hydrocyanic acid to aldehyde present is at least 1:1, and said catalyst being present in an amount in the range from about 1% to about 3% by weight of the copolymer.

6. The product of the process described in claim 1.
7. The product of the process described in claim 2.
8. The product of the process described in claim 3.
9. The product of the process described in claim 4.
10. The product of the process described in claim 5.

11. A polymeric composition characterized in that it contains as a repeating unit in its structure the grouping described by the general formula

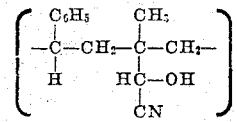

References Cited in the file of this patent

UNITED STATES PATENTS

| | | |
|---|---|---|
| 2,256,152 | Nutting et al. | Sept. 16, 1941 |
| 2,495,284 | Pinkney | Jan. 24, 1950 |